United States Patent
Hallman

(10) Patent No.: US 9,278,663 B1
(45) Date of Patent: Mar. 8, 2016

(54) INFLATABLE RESTRAINTS FOR REMOVABLE VEHICLE COMPONENTS

(71) Applicant: Toyota Motor Engineering & Manufacturing North America, Inc., Erlanger, KY (US)

(72) Inventor: Jason J. Hallman, Saline, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/574,139

(22) Filed: Dec. 17, 2014

(51) Int. Cl.
| | |
|---|---|
| B60R 21/16 | (2006.01) |
| B60R 21/231 | (2011.01) |
| B60R 21/18 | (2006.01) |
| B60R 21/20 | (2011.01) |
| B60N 2/005 | (2006.01) |
| B60R 21/26 | (2011.01) |

(52) U.S. Cl.
CPC .............. B60R 21/231 (2013.01); B60N 2/005 (2013.01); B60R 21/18 (2013.01); B60R 21/20 (2013.01); *B60R 2021/23146* (2013.01); *B60R 2021/26094* (2013.01)

(58) Field of Classification Search
USPC .............................................. 280/730.2, 733
See application file for complete search history.

(56) References Cited

U.S. PATENT DOCUMENTS

| | | | | |
|---|---|---|---|---|
| 5,472,231 A * | 12/1995 | France | ..................... | B60R 21/18 280/733 |
| 5,556,129 A | 9/1996 | Coman et al. | | |
| 5,804,887 A | 9/1998 | Holzapfel et al. | | |
| 6,109,647 A * | 8/2000 | Akaba | ..................... | B60R 21/18 280/733 |
| 7,086,663 B2 * | 8/2006 | Honda | ................... | B60R 21/207 280/730.2 |
| 7,677,598 B1 | 3/2010 | Ryan et al. | | |
| 8,016,362 B2 * | 9/2011 | Itoga | ........................ | B60R 21/18 280/733 |
| 8,469,395 B2 | 6/2013 | Richez et al. | | |
| 8,690,188 B2 * | 4/2014 | Fiore | ..................... | B60N 2/2812 280/733 |
| 2002/0130498 A1 * | 9/2002 | Kurata | ..................... | B60R 21/18 280/733 |
| 2006/0012159 A1 * | 1/2006 | Kore | ........................ | B60R 21/18 280/733 |
| 2006/0055158 A1 * | 3/2006 | Park | ........................ | B60R 21/18 280/733 |
| 2007/0102910 A1 * | 5/2007 | Nezaki | ..................... | B60R 21/18 280/733 |
| 2009/0160168 A1 * | 6/2009 | Itoga | ........................ | B60R 21/18 280/733 |
| 2009/0200775 A1 * | 8/2009 | Sugimoto | ............. | B60R 21/207 280/730.2 |
| 2009/0283994 A1 * | 11/2009 | Ruthinowski | ........... | B60R 21/18 280/733 |
| 2012/0319386 A1 * | 12/2012 | Bahr | ..................... | B60R 21/268 280/733 |

FOREIGN PATENT DOCUMENTS

FR 2879528 A1 6/2006

* cited by examiner

*Primary Examiner* — Toan To
(74) *Attorney, Agent, or Firm* — Christopher G. Darrow; Darrow Mustafa PC

(57) ABSTRACT

Inflatable restraint assemblies for use with removable vehicle components allow portions of inflator assemblies to remain in the vehicle when the component is removed. The assemblies may include inflatable devices such as an airbag mounted within a removable seat with conduit connecting the inflatable device to a seat connection. The seat connection may be adapted to connect to an inflator connection that is connected to an inflator assembly within the vehicle. Such assemblies allow the inflatable device to be in fluid communication with the inflator assembly when in an installed position, and to allow the inflator assembly to remain attached within the vehicle when the seat is in a removed position.

17 Claims, 5 Drawing Sheets

INFLATABLE RESTRAINTS FOR REMOVABLE VEHICLE COMPONENTS

BACKGROUND OF THE DISCLOSURE

The present disclosure relates generally to vehicle interior components, and more particularly, to removable vehicle components having inflatable restraints.

Modern vehicles commonly have a variety of safety equipment including inflatable restraint assemblies integrated with vehicle components such as seats to cushion or shield occupants within the vehicle. Such assemblies may include inflatable restraints mounted within a vehicle seat such as side seat airbags, knee airbags, inflatable seat belts, and active head restraints. Some inflatable restraint assemblies may include an inflatable airbag and an inflator. In response to an activation event, a sensor activates the inflator to generate an inflation gas that rapidly inflates the inflatable airbag to facilitate protection of an occupant.

Vehicles may be equipped with removable vehicle components such as seating to increase adaptability for different cargo and occupant loading. Inflatable restraints may be incorporated into vehicle seats by mounting an inflator and inflatable airbag to internal seat structure. It may, due in part to storage and electrical issues, be undesirable to include an inflator within a removable seat that may be installed and removed from a vehicle.

SUMMARY OF THE DISCLOSURE

Vehicle seat assemblies and inflatable restraints for removable vehicle components are described herein where inflatable devices are incorporated within a vehicle component configured to be removably attachable to the interior of a vehicle. The vehicle component may be a seat that includes an inflatable restraint fluidly connected to a seat connector. The seat connector is adapted to attach to an inflator connector that is fluidly connected to an inflator. The restraint assemblies allow for a seat having the inflatable restraint to be removed while allowing the inflator to remain inside the vehicle.

In one implementation, a removable vehicle seat assembly may include a seat having a seat base and a seat back and an inflatable device operatively associated with the seat. The assembly may also include a seat connector configured for operative connectivity with an inflator device located outside the seat and within a vehicle to permit fluid communication between the inflator device and the inflatable device when the seat is in an attached position.

In another implementation, an inflatable restraint assembly may include a removable vehicle component configured for selective attachment and detachment from an interior portion of a vehicle, an inflatable restraint operatively connected with the removable vehicle component, and an inflator device located outside the removable vehicle component and within the vehicle. The inflatable restraint may be in position for fluid connection with the inflator device when the removable vehicle component is in an attached position.

In yet another implementation, an inflatable restraint assembly may include a removable vehicle seat configured for selective attachment and detachment from an interior portion of a vehicle, an inflatable restraint operatively connected with the removable vehicle seat, a conduit connecting the inflatable restraint in fluid communication to a seat connector, an inflator device located within the interior portion of the vehicle, and an inflator connector in fluid communication to the inflator device. The seat connector may engage the inflator connector in fluid communication when the removable vehicle seat is in an attached position.

The foregoing features and elements may be combined in various combinations without exclusivity unless expressly indicated otherwise. These features and elements as well as the operation thereof will become more apparent in light of the following description and the accompanying drawings. It should be appreciated, however, that the following description and drawings are intended to be exemplary in natures and non-limiting.

DETAILED DESCRIPTION

Figure 1:
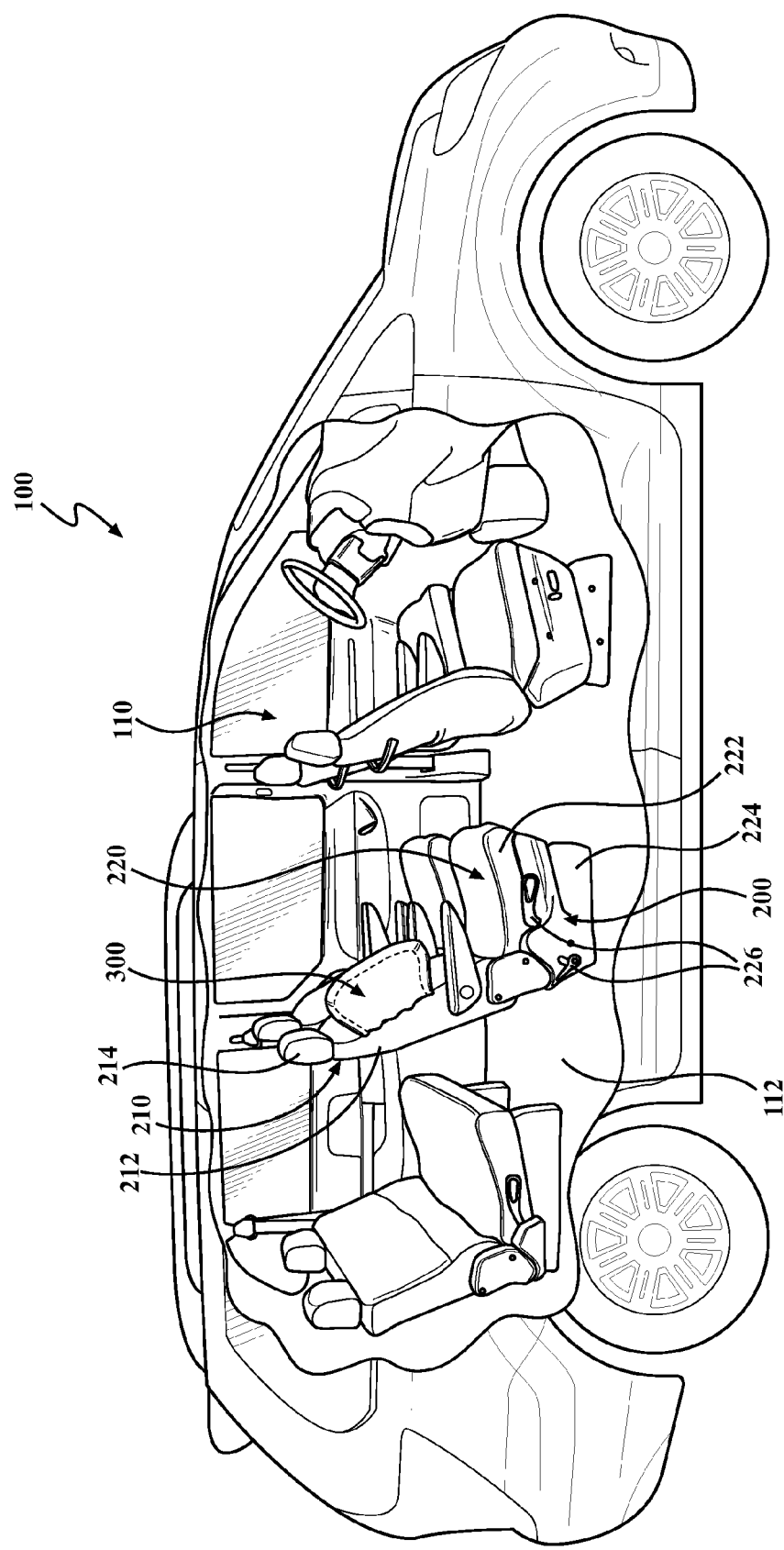
FIG. 1 is a partial cutaway perspective view of a vehicle interior having a removable seat with an inflatable restraint.

Disclosed herein are inflatable restraint assemblies for use with removable vehicle components that allow portions of inflator assemblies to remain in the vehicle when the component is removed. The removable vehicle components may include a removable seat and the inflatable restraint assembly may include an airbag. Conduit may connect the inflatable device to a seat connector. The seat connector may be adapted to connect to an inflator connector that is connected to an inflator assembly within the vehicle. Such assemblies allow the inflatable device to be in fluid communication with the inflator assembly when in an installed position, and to allow the inflator assembly to remain attached within the vehicle when the seat is in a removed position. Examples described herein prevent situations where a live inflator assembly is retained in a vehicle seat removed from the vehicle. Additionally, the systems eliminate the need to connect and disconnect electrical wiring to an inflator assembly each time the vehicle seat is attached or removed.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

As used herein, "inflatable restraint" or "airbag" may include any safety device configured to provide restraint or cushion to occupants within a vehicle. Some embodiments described in this specification and Figures may include seat mounted side airbags, but other restraints may include other types of air bag assemblies, active head rests, and inflatable seat belts. The inflatable restraints may be inflated or activated upon activation events determined by vehicle systems.

As used herein, the term "activation event" may include any event in which it is desired for a restraint to deploy or activate. Some examples of activation events may include a collision involving the vehicle, sudden changes in measured acceleration or deceleration of the vehicle or occupants, rollover conditions, and vehicle component failure. Known automotive systems may send signals to an airbag assembly upon the sensing of an activation event.

As used herein, the term "operatively connected" or "operatively associated with" may include any direct or indirect connections, including connections without direct physical contact.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

FIG. 1 shows a partial cutaway perspective view of an exemplary vehicle 100 with a partial view of an interior 110. The interior 110 may include a floor 112 and may contain one or more removable vehicle components. In some embodiments, a removable vehicle component may be a seat 200 that includes inflatable restraint assembly 300 to increase the safety of an occupant of seat 200. As shown in FIG. 1, restraint assembly 300 may include a seat mounted side airbag. The restraint assembly 300 (shown in a deployed condition in FIG. 1) may be adapted to inflate upon an activation event to cushion, restrain, and protect occupants in seat 200. While embodiments described herein and in the Figures include seat 200 as a removable vehicle component, it is contemplated that removable vehicle components may also include a variety of other removable structures located within interior 110, such as modular safety devices, consoles, and interior trim and coverings.

Seat 200 may generally include a seat back 210 configured for selected positioning in generally upstanding orientations with respect to a seat bottom 220. Seat bottom 220 may include seat cushion 222 that contacts and supports an occupant. Seat base 224 may support the seat cushion 222 and may be configured for attachment to the floor 112. Seat bottom 220 may further include one or more seat adjustments 226 for changing characteristics of the seat cushion 222 or seat back 210, such as lumbar support or the angle between seat cushion 222 and seat back 210.

Seat back 210 generally includes a back cushion 212 and headrest 214. The back cushion 212 or headrest 214 may include one or more inflatable restraint assemblies 300, such as the deployed airbag shown in FIG. 1. For example, a folded airbag may be mounted within seat back 210 and configured to tear through a portion of back cushion 212 upon deployment.

Seat 200 may be moveable within or removable from vehicle 100, providing flexibility for different loading conditions. For example, seat 200 may be a seat in the second or third row of a passenger vehicle as generally shown in the Figures. Seat 200 may be removably attachable to floor 112 to allow vehicle 100 to provide more seating options or more cargo space. Seat 200 may also be configured to move positions within vehicle 100, such as sliding in different locations, or folding into compartments for storage.

Figure 2:
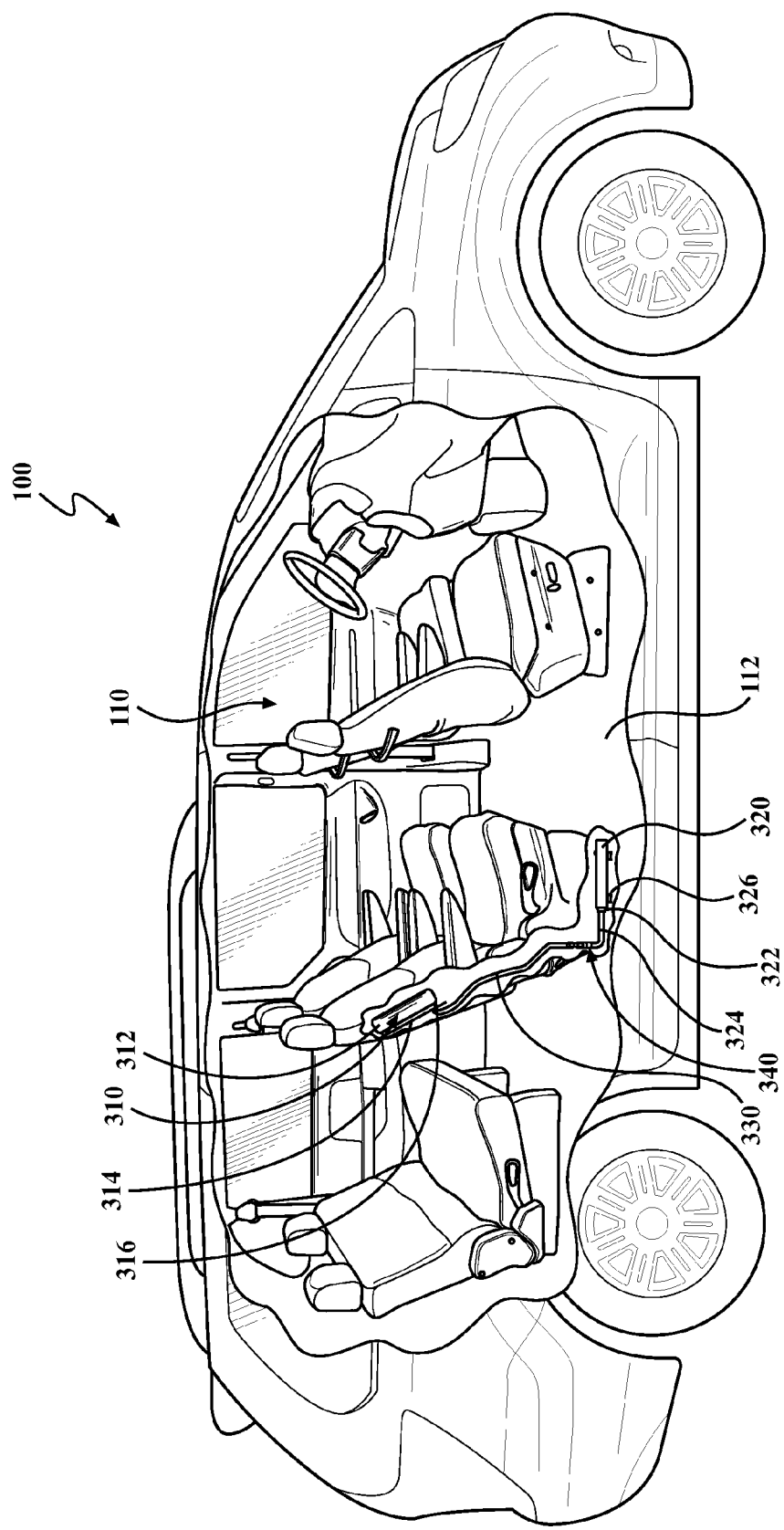
FIG. 2 is a partial cutaway perspective view of a vehicle interior having a removable seat showing internal inflatable restraint assembly components.

FIG. 2 shows more detail of certain embodiments of the components of inflatable restraint assembly 300. In some embodiments, restraint assembly 300 may include an airbag assembly 310, an inflator assembly 320, conduit 330, and a connection 340. Some embodiments may allow for the inflator assembly 320 to be located within vehicle 100 when seat 200 is removed or re-positioned with respect to interior 110.

In one or more arrangements, airbag assembly 310 may include an inflatable airbag 312, airbag mount 314, and an airbag inlet 316. Airbag 312 may be manufactured out of a variety of materials known to those skilled in the art, such as fabrics including nylon or polyester. Airbag 312 may be sized to provide proper volume and positioning during deployment subsequent an activation event. Airbag 312 may be stored in a folded or rolled condition (as shown in FIG. 2). Airbag mount 314 is configured to retain airbag 312 to a portion of seat 200. For example, airbag mount 314 may be attachable to portions of a seat frame during seat manufacturing or installation. Airbag inlet 316 is located in airbag 312 to allow air to flow into and inflate the airbag 312. Airbag inlet 316 is shown towards the bottom of airbag 312 but it is contemplated that one or more inlets 316 may be located at different positions on airbag 312.

As illustrated in FIG. 2, restraint assembly 300 may include conduit 330 that connects airbag assembly 310 to connection 340 in fluid communication. Conduit 330 may be capable of withstanding high pressures of air during deployment of airbag 312. In some embodiments, conduit 330 may be tubing. Conduit 330 may be manufactured from a variety of materials, such as nylon or polyethylene. Conduit 330 may be flexible and include appropriate length to allow seat 200 to be manipulated between different seating positions. For example, conduit 330 length, sizing, and attachment locations may be selected that allow for a desired range of reclining of seat back 210. Conduit 330 may connect to airbag assembly 310 via airbag inlet 316 at one end, and to a seat connector 344 at the other.

Figure 3:
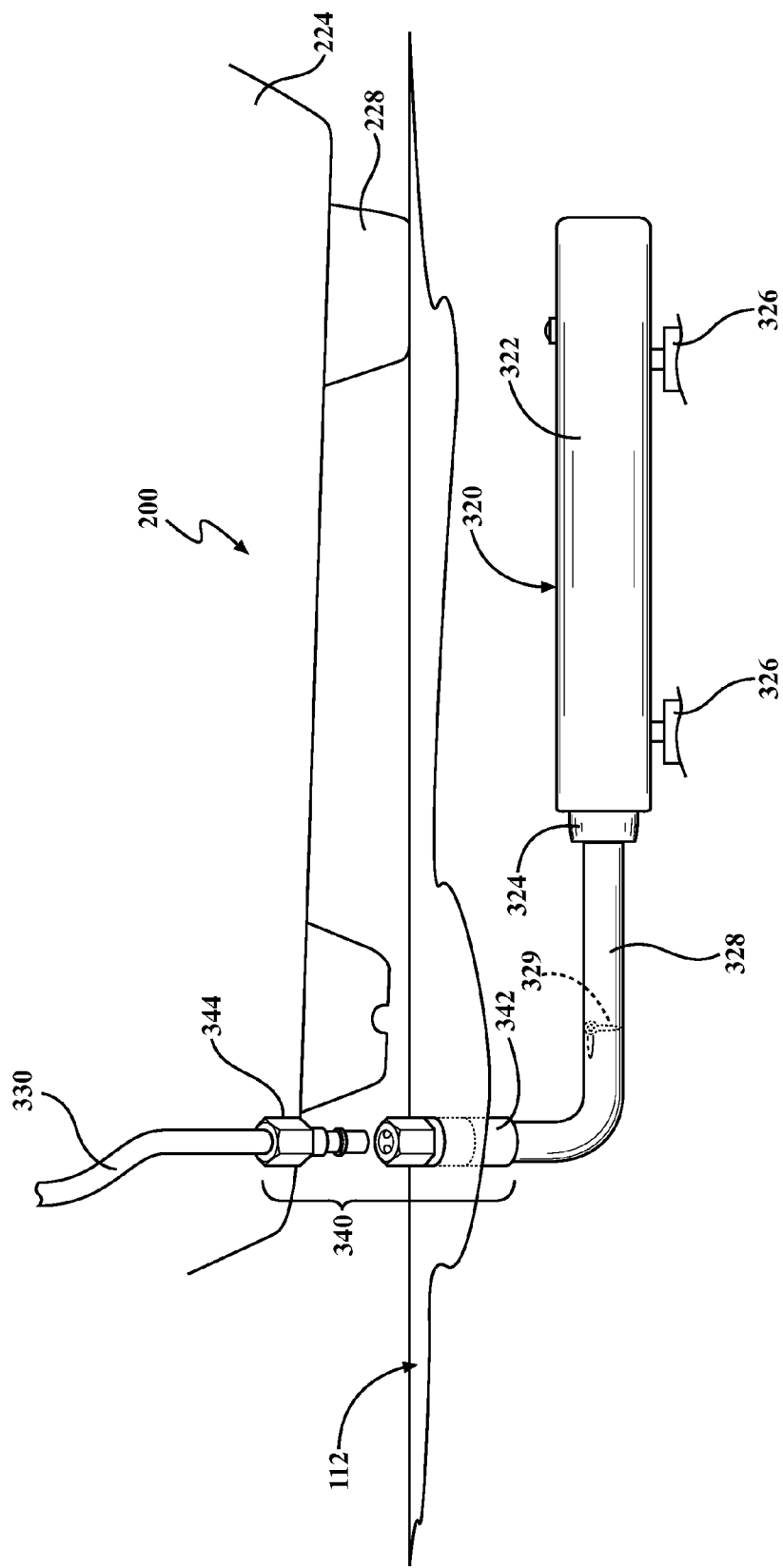
FIG. 3 is a partial sectional view showing components of an inflatable restraint assembly located in the floor and a removable seat of a vehicle.
Figure 4:
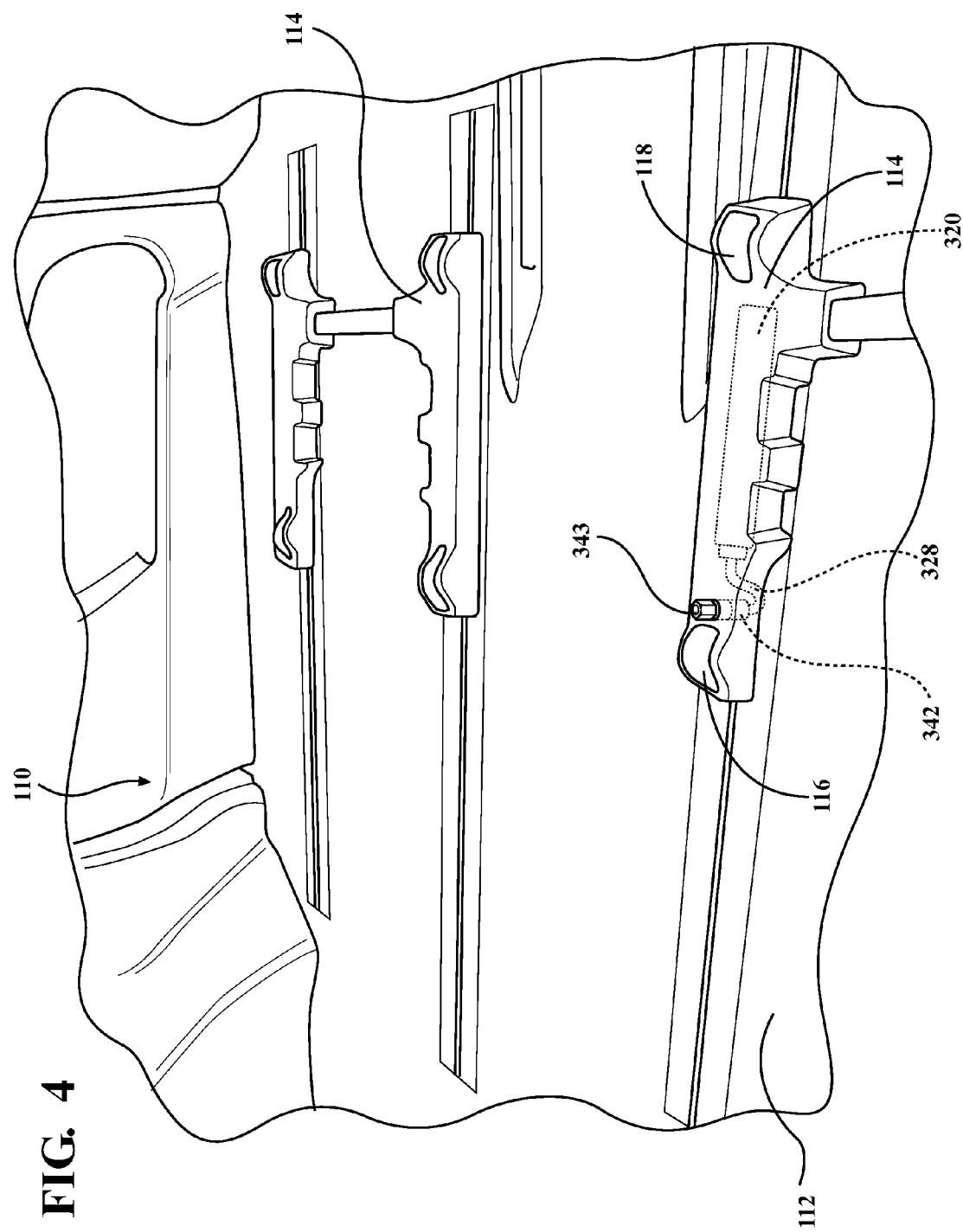
FIG. 4 shows a perspective view of a vehicle interior showing one embodiment of the location of an inflator and inflator connector.

As shown in FIGS. 2-4, the inflatable restraint assembly 300 may contain one or more inflator assemblies 320 attached within vehicle 100. In some embodiments, inflator assembly 320 includes an inflator body 322, inflator outlet 324, inflator mounts 326, and outlet tube 328. Inflator body 322 may be cylindrical as shown in the Figures. In some embodiments, inflator body 322 may be a pyrotechnical type inflator, wherein combustion is used to generate gas from a propellant. In some embodiments, inflator body 322 may be a container capable of storing a compressed gas for output to airbag 312. Inflator body 322 may also be a combination of a pyrotechnical and stored gas type. Inflator outlet 324 may extend from inflator body 322 and may terminate with outlet tube 328 or inflator connector 342.

Inflator assembly 320 may include inflator mounts 326 to attach the inflator body 322 to portions of vehicle 100. For example, mounts 326 may be configured to attach inflator body 322 within the floor 112 of vehicle 100 proximate to seat 200. It is further contemplated that inflator assembly 320 be attached to other locations within the vehicle 100 depending on the particular application.

In some embodiments, inflator assembly 320 may be in electrical communication with vehicle systems through wired or wireless connections. For example, inflator body 322 may be electrically connected to one or more vehicle electronic control units (ECU). One or more vehicle ECUs may send signals to the inflator assembly 320 when an activation event is determined. The electrical connection may also provide power to cause the inflator assembly 320 to introduce gas towards the airbag assembly 310. Inflator assembly 320 may be configured to remain in vehicle 100 when seat 200 is in a detached or removed position and remain electrically connected to other vehicle systems. This would alleviate the need to include additional electric connectors to allow the attachment and removal of electronic communication to inflator assemblies that are removed with vehicle seating. Such electrical connections may add complexity, weight, and cost, and may wear out or fail after several cycles. Furthermore, constant electrical connection of the inflator assembly 320 eliminates the need for a user to remember to property connect and disconnect electrical connections each time seat 200 is removed/attached. In addition, the constant electronic connection of inflator assembly 320 eliminates variables in other vehicle systems that would otherwise have to determine if the inflator assembly 320 is connected.

In some embodiments, inflator assembly 320 may include an outlet tube 328 extending from the inflator outlet 324 to connection 340. Outlet tube 328 may be manufactured form a variety of materials into a variety of lengths and sizes to provide the inflator body 322 to be in fluid communication with connection 340. Outlet tube 328 may, for example, be made from materials such as nylon or polyethylene.

As best illustrated in the embodiment of FIG. 3, some embodiments of outlet tube 328 may contain a valve 329 that allows the passage of air from inflator body 322 through outlet tube 328 and to connection 340. Valve 329 may be a one-way valve that permits the passage of air only in the direction from inflator assembly 320 towards connection 340. In some embodiments, valve 329 may be a burst or rupture disc having a non-reclosing membrane configured to rupture at certain pressures. Valve 329 may also be located within connection 340 or inflator outlet 324. Valve 329 may prevent debris from entering connection 340, outlet tube 328, or inflator outlet 324.

In some embodiments, connection 340 may include a seat connector 344 and an inflator connector 342. Seat connector 344 and inflator connector 342 may be positioned for engagement when the seat 200 is in an attached position. In one or more arrangements, seat connector 344 may be attached near the seat base 224 and attached to conduit 330. Inflator connector 342 may be attached to outlet tube 328 or inflator outlet 324. Connection 340 may be configured such that in a connected position the inflator assembly 320 is fluidly connected to the airbag assembly 310. That is, air may flow from inflator assembly 320, through connection 340, through conduit 330, and into airbag inlet 316 during deployment.

Connection 340 may include a variety of shapes and sizes for inflator connector 342 and seat connector 344. For example, connection 340 may be a mating connection in which inflator connector 342 and seat connector 344 have mutually complementing shapes. In some embodiments, seat connector 344 may represent a male connector configured to enter a female inflator connector 342. Connection 340 may sealingly connect the inflator connector and seat connector 342/344, by having one or more seals engageable when the seat 200 is in an attached position. Seals located within connection 340 may, for example, be manufactured out of a compliant and resilient material that sits in contact with inflator connector 342 and/or seat connector 344.

FIG. 3 shows inflator assembly 320 mounted below a top surface of floor 112. Inflator assembly 320 may be retained stationary within vehicle 100, with a portion of inflator connector 342 exposed above the top surface of floor 112. Alternatively, inflator connector 342 may be located below the surface of floor 112 and seat connector 344 may be configured to extend downward and beyond the top surface of floor 112 to connect to inflator connector 342.

In some embodiments shown in the Figures, inflator connector 342 and seat connector 344 are generally shown in vertical alignment with each other when seat 200 is in an attached position. In addition, connection 340 is generally shown towards the rear of seat 200 and the corresponding location on floor 112. It is contemplated that connection 340, inflator connector 342 and seat connector 344 may be provided in any location or orientation to position them for fluid connection.

Additionally, inflator connector 342 and seat connector 344 may engage and disengage with each other in a variety of ways, depending on the characteristics of the connectors. In some embodiments, connection 340 is adapted such that fluid communication is achieved automatically as the vehicle component is attached within the vehicle. Alternatively, connection 340 may allow for a user to manually connect the inflator connector 342 and seat connector 344. In some embodiments, inflator connector 342 and seat connector 344 may engage upon a force applied to one or both in a direction towards each other. The connectors may disengage during application of a force in opposite directions. It is also contemplated that one or more actuators may be used to engage or disengage connection 340, with or without locking features. For example, a mechanical or electrical actuator may be used to disengage connection 340 and allow seat connector 344 to be separated from inflator connector 342. In some embodiments, an actuator may be connected to or integrated with a seat attachment actuator. Thus, a user may actuate a seat release that also disengages connection 340.

FIG. 4 shows an embodiment where inflator assembly 320 and inflator connector 342 are retained within floor tracks 114 on floor 112. Floor tracks 114 may be attached to floor 112 and may extend beyond or sit on a top-facing surface of floor 112. In some embodiments, floor tracks 114 include rear seat mount 116 and front seat mount 118 configured to receive and retain portions of seat base 224. Inflator assembly 320 may be contained within floor tracks 114 such that plastic or carpeting covers them from occupant view and contact. Floor tracks 114 may be configured to move within vehicle interior 110, such as sliding forward and rearward within the vehicle 100. Thus, in some embodiments the inflator assembly 320 and/or the connection 340 may move with seat 200, but remain in vehicle 100 when seat 200 is removed.

Figure 5A:
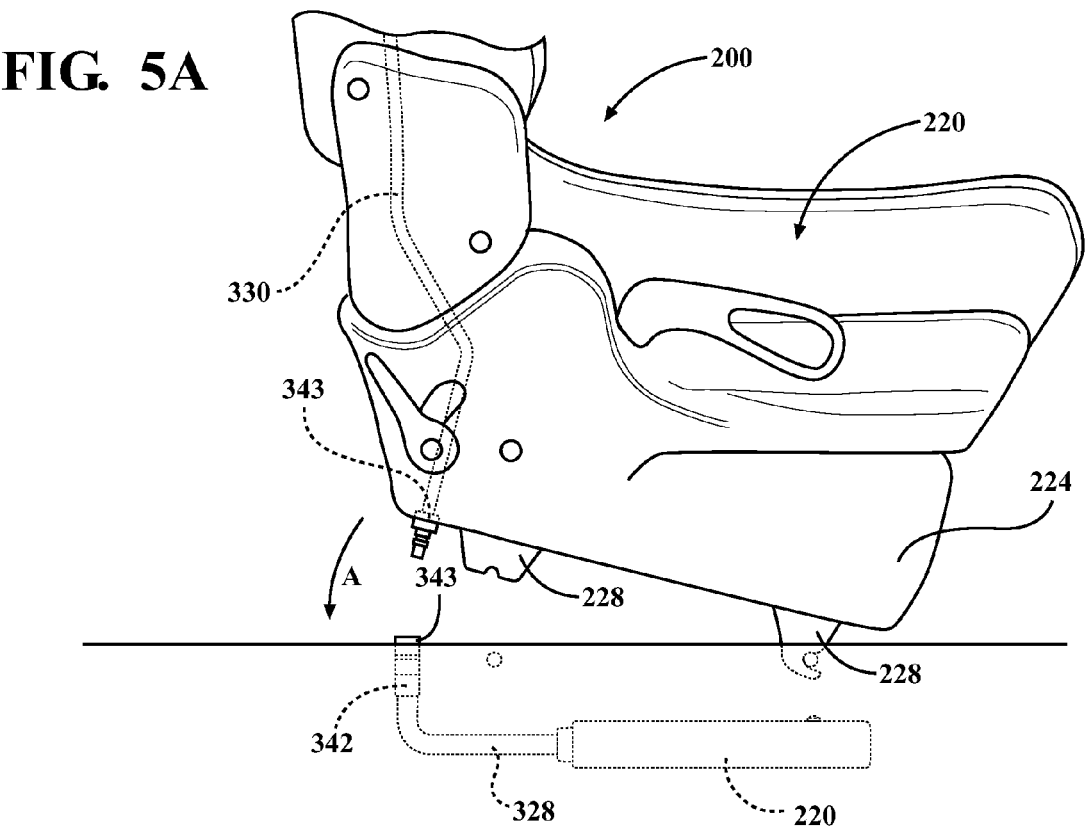
FIGS. 5A and 5B show a removable seat with an inflatable restraint assembly being attached.
Figure 5B:
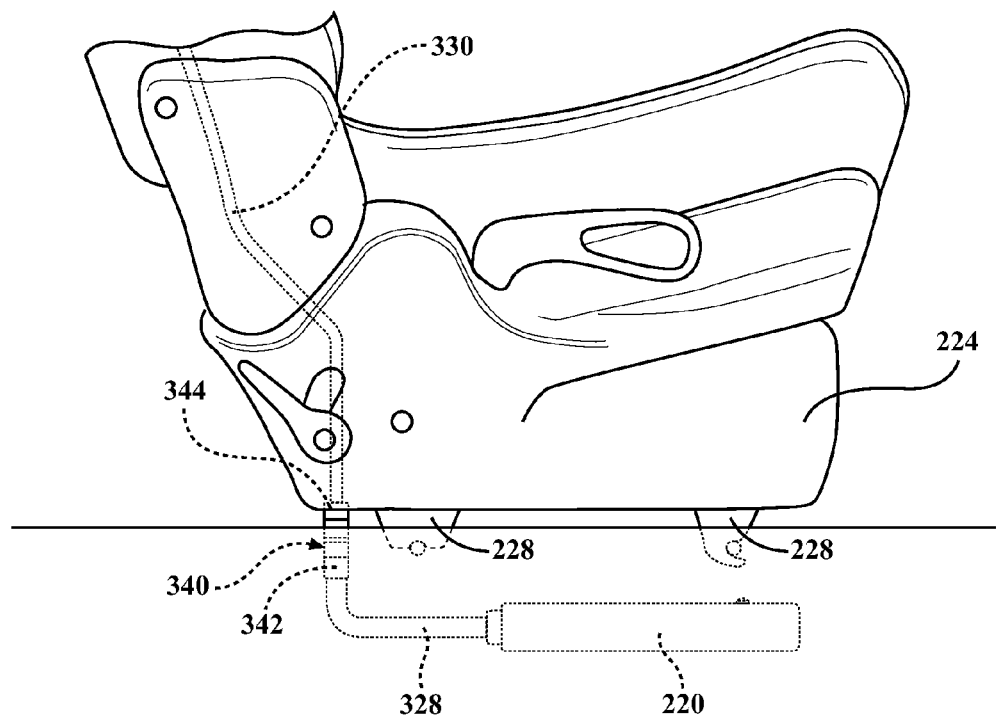

FIGS. 5A and 5B show an example seat 200 and inflatable restraint assembly 300 in which seat connector 344 is connected to inflator connector 342 during seat 200 installation into the vehicle. For example, seat 200 may first be attached at seat mount 228 towards the front of seat 200 as shown in FIG. 5A. Seat 200 may be rotated in the direction of arrow A to allow the seat mount 228 towards the rear of the seat to engage mounting portions in the vehicle. As the seat 200 is rotated into an installed position, seat connector 344 may line up and connect with inflator connector 342.

While the embodiments shown in the Figures generally describe one airbag assembly 310 corresponding to one inflator assembly 320, it is contemplated that any number of inflator assemblies 320 may be used to activate or deploy any number of airbag assemblies 310. For example, one inflator assembly 320 may be configured to send air to multiple airbag assemblies 310, through one or more connections 340. Additionally, inflator assemblies 320 may be mounted in or near floor 112 of vehicle 100 as shown, or may be mounted in other locations such as in the sides of vehicle 100.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A removable vehicle seat assembly comprising:
   a seat having a seat base and a seat back, the seat being configured for selective removal from and attachment to a vehicle;
   an inflatable device mounted to the seat, the inflatable device being configured to remain mounted to the seat when the seat is removed from the vehicle; and
   a seat connector configured for operative connectivity with an inflator device located outside of the seat and within the vehicle to permit fluid communication between the inflator device and the inflatable device when the seat is in an attached position.

2. The removable vehicle seat assembly of claim 1, wherein the inflatable device comprises a side airbag mounted within the seat back.

3. The removable vehicle seat assembly of claim 1, wherein the inflatable device comprises one of an inflatable seat belt or active headrest.

4. The removable vehicle seat assembly of claim 1, wherein the inflator device is located within a floor of the vehicle.

5. The removable vehicle seat assembly of claim 1, wherein the inflator device is located above a top surface of a floor of the vehicle within floor tracks that may selectively move with respect to the floor.

6. The removable vehicle seat assembly of claim 1, further comprising a conduit connected in fluid communication with the inflatable device and the seat connector.

7. The removable vehicle seat assembly of claim 6, wherein the seat connector is located near a bottom portion of the seat base.

8. The removable vehicle seat assembly of claim 7, wherein the seat connector is configured to engage with an inflator connector located near a floor surface of the vehicle, the inflator connector being in fluid communication with the inflator device.

9. An inflatable restraint assembly comprising:
   a removable vehicle component configured for selective attachment and detachment from an interior portion of a vehicle;
   an inflatable restraint operatively connected with the removable vehicle component; and
   an inflator device located outside of the removable vehicle component and within the vehicle,
   the inflatable restraint being in position for fluid connectivity with the inflator device when the removable vehicle component is in an attached position, and
   the inflator device including a valve configured to allow one-way fluid passage, the valve including a burst disc located in an inflator outlet tube.

10. An inflatable restraint assembly comprising:
    a removable vehicle seat configured for selective removal from and attachment to an interior portion of a vehicle;
    an inflatable restraint mounted to the removable vehicle seat, the inflatable device being configured to remain mounted to the removable vehicle seat when removed from the interior portion of the vehicle;
    a conduit connecting the inflatable restraint in fluid communication to a seat connector;
    an inflator device located within the interior portion of the vehicle; and
    an inflator connector in fluid communication to the inflator device,
    wherein the seat connector engages the inflator connector in fluid communication when the removable vehicle seat is in an attached position.

11. The inflatable restraint assembly of claim 10, wherein the inflatable restraint comprises a side airbag mounted within a seat back of the removable seat.

12. The inflatable restraint assembly of claim 11, wherein the inflator device is located within a floor assembly of the interior portion of the vehicle.

13. The inflatable restraint assembly of claim 11, wherein the conduit comprises tubing connecting the side airbag and the seat connector.

14. The inflatable restraint assembly of claim 10, wherein the seat connector is located near a bottom portion of a seat base, and wherein the seat connector is in fluid connection with the inflator connector when the vehicle seat is in the attached position.

15. The inflatable restraint assembly of claim 10, wherein the inflator device further comprises a valve configured to allow one-way fluid passage.

16. The inflatable restraint assembly of claim 15, wherein the valve comprises a burst disc located in an inflator outlet tube.

17. The inflatable restraint assembly of claim 10, wherein the conduit comprises tubing connected to the inflatable restraint and the seat connector.

* * * * *